(12) United States Patent
Fairchild

(10) Patent No.: US 7,236,709 B1
(45) Date of Patent: Jun. 26, 2007

(54) MULTI-INPUT WAVELOCKER FOR CONTROLLING LASER WAVELENGTHS OF MULTIPLE LASERS

(75) Inventor: Scot Fairchild, Santa Clara, CA (US)

(73) Assignee: Avanex Corporation, Fremont, CA (US)

( * ) Notice: Subject to any disclaimer, the term of this patent is extended or adjusted under 35 U.S.C. 154(b) by 1339 days.

(21) Appl. No.: 09/792,792

(22) Filed: Feb. 22, 2001

Related U.S. Application Data

(60) Provisional application No. 60/242,056, filed on Oct. 20, 2000.

(51) Int. Cl.
*H04B 10/12* (2006.01)

(52) U.S. Cl. .................................. 398/196; 398/156

(58) Field of Classification Search ............... 398/123, 398/122, 95, 196, 88, 49, 131, 129, 156, 398/195, 34
See application file for complete search history.

(56) References Cited

U.S. PATENT DOCUMENTS

| | | | | |
|---|---|---|---|---|
| 3,604,936 A | * | 9/1971 | Kompfner | .................... 398/52 |
| 4,989,201 A | * | 1/1991 | Glance | ........................ 398/95 |
| 5,684,614 A | * | 11/1997 | Degura | ....................... 398/131 |
| 6,061,158 A | * | 5/2000 | DeLong | ...................... 398/196 |
| 6,240,109 B1 | * | 5/2001 | Shieh | ........................... 372/18 |
| 2002/0064192 A1 | * | 5/2002 | Missey et al. | ................. 372/20 |

\* cited by examiner

*Primary Examiner*—Christina Leung
(74) *Attorney, Agent, or Firm*—Patterson & Sheridan, LLP

(57) ABSTRACT

Techniques for coupling output laser beams from multiple lasers into multiple fibers and using a collimating lens and a steering mirror to individually couple the laser beams from the fibers to a laser control system.

8 Claims, 2 Drawing Sheets

US 7,236,709 B1

MULTI-INPUT WAVELOCKER FOR CONTROLLING LASER WAVELENGTHS OF MULTIPLE LASERS

This application claims the benefit of U.S. Provisional Application No. 60/242,056, filed on Oct. 20, 2000.

TECHNICAL FIELD

This application relates to a mechanism for controlling an output wavelength of a laser.

BACKGROUND

An optical wavelength-division multiplexed (WDM) system uses a single fiber link to simultaneously transmit optical signals at different carrier wavelengths. Dense WDM (DWDM) techniques have been used to increase the number of multiplexed wavelengths in a WDM fiber link by reducing the wavelength spacing between two adjacent wavelengths. Such WDM and DWDM systems use multiple lasers at different WDM wavelengths to produce the optical carriers.

It is desirable to stabilize the laser wavelengths of the multiple lasers at their respective, pre-selected WEM wavelengths. One standard for the WDM wavelengths is established by the International Telecommunications Union (ITU) in which the separation between two adjacent communication channels is 0.8 nm, or 100 GHz in frequency. Thus, the lasers for WDM systems should have narrow output linewidths at those ITU WDM wavelengths. In addition, the wavelength of each WDM laser should be stable to avoid drifting into the wavelength range allocated for an adjacent channel.

A wavelength control system, e.g., a wavelocker, may be used to control the output laser wavelength of a laser. Such a system may include a detection unit to measure the variation of the output laser wavelength from a desired laser wavelength and a locking mechanism to adjust the laser by negating the variation so that the output laser wavelength is locked at the desired laser wavelength.

SUMMARY

An optical device according to one embodiment of the present disclosure includes a plurality of optical fibers respectively having input distal terminals to receive different optical beams and output distal terminals coupled together to output the optical beams. A lens is positioned to receive the optical beams from the output distal terminals and to direct said optical beams to pass through or near a common location in different directions with respect to one another. A steering mirror is positioned in optical paths of the optical beams from the lens to receive said optical beams with different incident directions.

The device also includes a mirror control module coupled to the steering mirror. The control module is operable to adjust the steering mirror at a plurality of selected steering angles to respectively reflect the optical beams from the different incident directions to propagate along a common direction, one beam at a time.

Tunable lasers may be respectively coupled to the fibers to produce the optical beams. A single Fabry-Perot cavity may be spaced from the steering mirror and placed in the common direction to receive the optical beams. The transmitted output signals from the cavity may be used to control the frequencies of the tunable lasers.

DESCRIPTION

Figure 1:
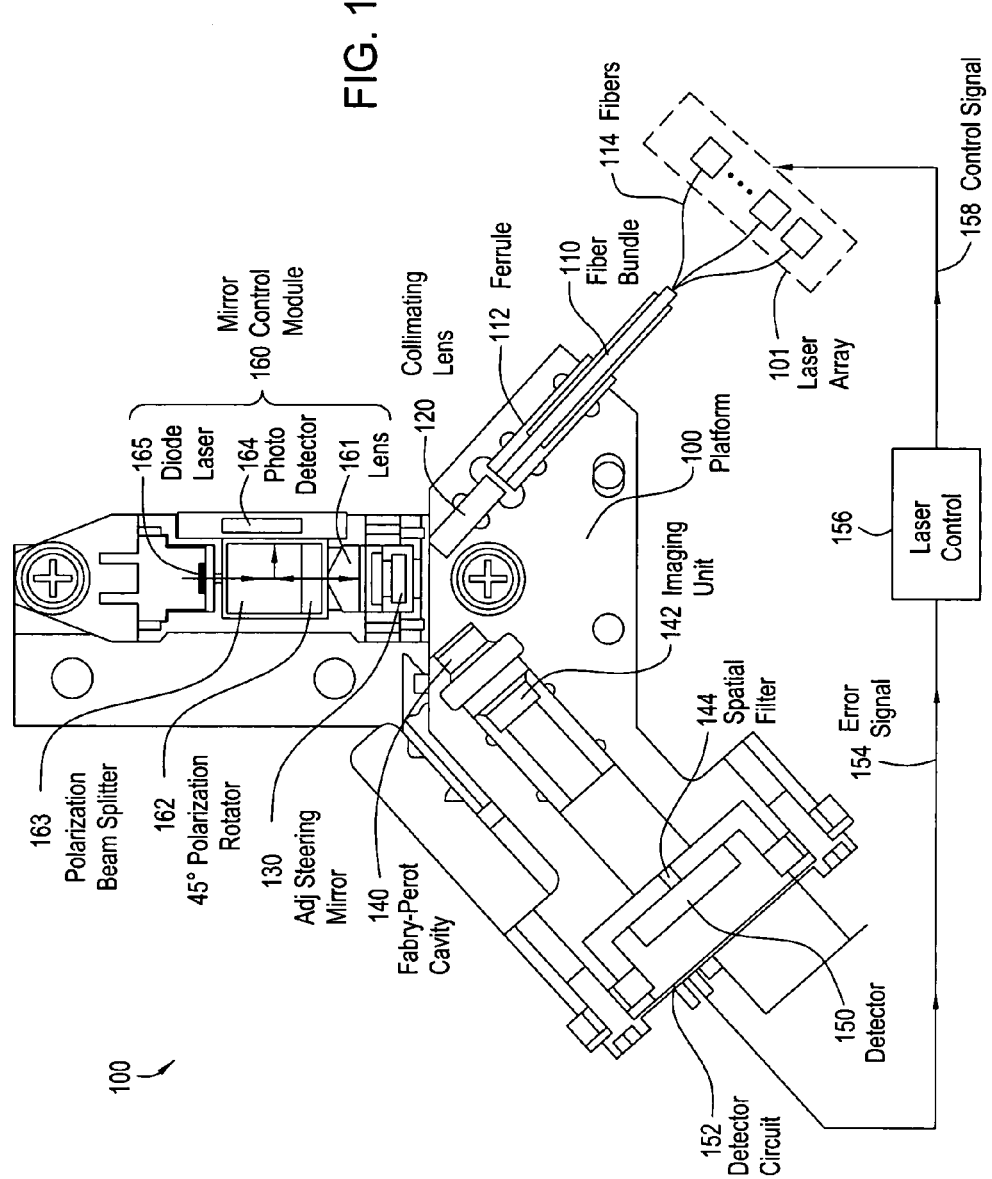
FIG. 1 shows a wavelocker for controlling laser wavelengths of multiple lasers according to one embodiment.

FIG. 1 shows one implementation of a wavelocker for controlling an array of lasers 101 which are to be stabilized at laser frequencies that are evenly spaced from one another, e.g., the ITU-specified WDM wavelengths with a constant spacing of 0.8 nm. The wavelocker uses a single Fabry-Perot cavity 140 or other types of frequency-discriminator device to detect and monitor the frequency shift of each of the lasers 101. A detector 150 is coupled to detect the transmission of the output laser beams from the lasers 101, one beam at a time. A detector circuit 152 receives the measured transmission of the Fabry-Perot cavity 140 for a particular laser in the lasers 101 and produces an error signal to represent the corresponding frequency shift of the actual laser wavelength from the desired laser wavelength.

The Fabry-Perot cavity 140 is designed to have a fixed cavity length so that the free spectrum range is substantially equal to the frequency spacing between two adjacent desired wavelengths of the lasers 101. Under this condition, the detector 150 can be calibrated to use the transmission of a beam through the cavity 140 to determine the frequency shift and hence the error signal 154. See, U.S. patent application Ser. No. 09/715,766 filed on Nov. 17, 2000, which is incorporated herein by reference.

A laser feedback control module 156 is provided to generate a control signal 158 according to the error signal 154 for controlling that particular laser in the lasers 101 to negate the respective frequency shift. The wavelocker then proceeds to direct the transmission of another laser through the Fabry-Perot cavity 140 into the detector 150 to detect its frequency shift and to control the other laser accordingly. Hence, the wavelocker is designed to share the Fabry-Perot cavity 140, the detector 150, the detector circuit 152, and the laser control 156 among the lasers 101 by detecting and controlling one laser at a time.

The lasers 101 may be any tunable lasers, such as laser diodes, and are operable to produce multiple output laser beams at different laser wavelengths. Fibers 114 are respectively coupled to the lasers 101 to receive the output laser beams. The fibers 114 are closely bundled together to form a fiber bundle 110. The end facet of each fiber may be polished to reduce the optical loss. A single ferrule 112 may be used to receive the fiber bundle 110 and to hold the distal terminals at fixed positions with respect to one another. The fibers 114 may be adhered together by using epoxy or other suitable adhesives.

The wavelocker implements an optical steering module to couple different output beams from the lasers 101 into the Fabry-Perot cavity 140 and directs the output beams transmitted through the Fabry-Perot cavity 140 into the detector 150, one at a time. The optical steering module includes a collimating lens 120 and an adjustable steering mirror 130. The collimating lens 120 is positioned close to the output terminal of the fiber bundle 110 so that it can receive all output beams. The output beams transmitting through the lens 120 are then directed to the steering mirror 130 at different incident angles. This use of a single collimator lens 120 to couple multiple laser beams to the Fabry-Perot cavity 140 can simplify the system design and reduce the coverall cost.

Figure 2:
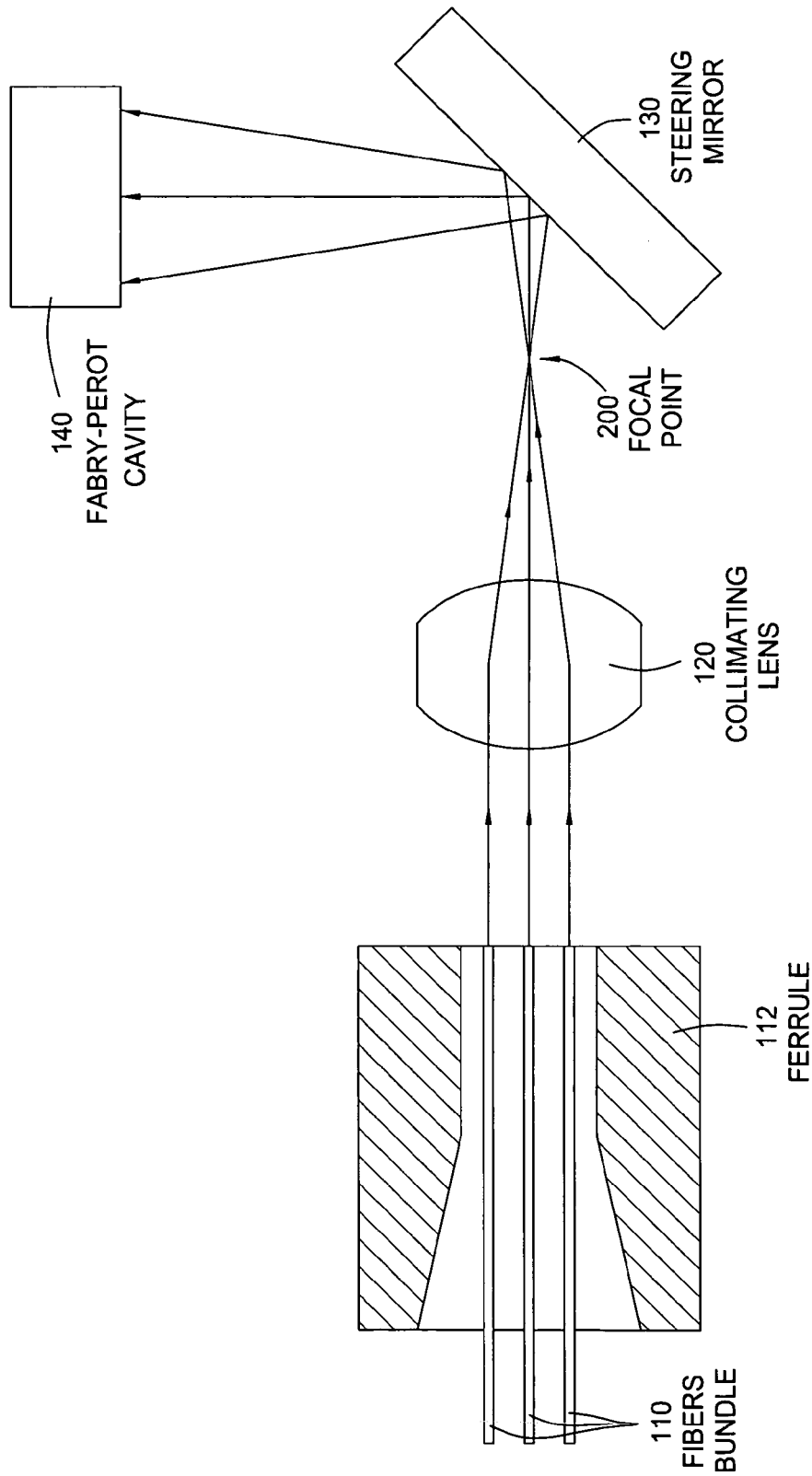
FIG. 2 shows an exemplary optical arrangement for coupling different beams from different lasers into the Fabry-Perot cavity in the wavelocker in FIG. 1.

FIG. 2 shows an exemplary optical arrangement of the fiber bundle 110, the lens 120, the steering mirror 130, and the Fabry-Perot cavity 140. The lens 120 is positioned so that it focuses the output beams at or near a common focal point 200 slightly spaced away from the reflective surface of the steering mirror 130. Alternatively, the lens 120 may be positioned to place the focal point 200 on the reflective surface. In either arrangement, the output beams from different lasers are incident to the steering mirror 130 at different and known angles and hence will be reflected towards the Fabry-Perot cavity 140 at different angles.

The steering mirror 130 is adjustable in its orientation and is placed in the optical paths of the laser beams directed from the collimator lens 120. Since the laser beams from the collimating lens 120 are incident at different, known angles, the orientation of the steering mirror 130 can be set accordingly at different, known steering angles to direct the laser beams, one at a time, into the Fabry-Perot cavity 140 in a direction substantially parallel to the optic axis of the Fabry-Perot cavity 140. The detector 150 is positioned to receive the transmission of only the beam that enters the cavity 140 in parallel to the cavity axis. An imaging unit 142 such as a lens or a combination of lenses, and a spatial filter 144 such as a small aperture may be used as a spatial filter to block other transmitted beams that enter the cavity 140 at various angles with respect to the cavity axis. The imaging unit 142 focuses only the transmitted beam which enters the cavity 140 in parallel to the cavity axis onto the photodetector 150 through spatial filter 144. The spatial filter 144 may be located right in the front of the detector 150.

A mirror control module 160 is implemented to control the orientation, i.e., the steering angles, of the steering mirror 130. The mirror control module 160 is designed to accurately set the orientation of the steering mirror 130 at the known steering angles for directing different laser beams from different lasers into the Fabry-Perot cavity 140, respectively. The control module 160 includes an actuator coupled to the steering mirror for adjusting the orientation of the steering mirror 130 (e.g., a galvanometer), and an active control unit for monitoring the orientation of the steering mirror 130. The following describes one embodiment of this active control unit.

The active control unit may use an optical monitor beam to monitor the actual orientation of the steering mirror 130 after the actuator is commanded to set the steering mirror 130 at a selected steering angle. The back surface of the steering mirror 130 can be made reflective to reflect this monitor beam. In essence, the reflective angle of the monitor beam is measured to determine the orientation of the steering mirror 130.

In one implementation, a diode laser 165 is used to produce the monitor beam to the back surface through a polarization beam splitter (PBS) 163 and a 45-degree polarization rotator 162 (e.g., a quarter wave plate) that are located between the laser 165 and the steering mirror 130. A lens 161 then images the monitor beam onto the reflective back surface of the mirror 130. The reflected monitor beam from the back surface of the mirror 130 passes through the lens 161 and the rotator 163 so that its polarization is rotated by 90 degrees due to the double pass. The PBS 163 then directs the reflected monitor beam, not back to the laser diode 165, but to a photodetector 164 that is operable to sense the position of the reflected monitor beam on its detector surface. When properly calibrated, the beam position on the detector 164 represents the reflective angle of the monitor beam from the back of the steering mirror 130. The photodetector 164 may be position-sensing detector, a detector with multiple sensing areas, or an array of photosensing pixels.

The position information of the reflected monitor beam on the photodetector 164 can be calibrated to represent the orientation of the mirror 130. This position information, therefore, can be used to measure a deviation between the actual steering angle of the mirror 130 and the desired steering angle to produce an error signal. The mirror control module 160 uses a feedback control circuit to control the actuator to reduce the deviation by adjusting the orientation of the mirror 130.

As illustrated in FIG. 1, the wavelocker may include a common platform 100 to support various components, including the ferrule 112, the collimator lens 120, the steering mirror 130 and its control module 160, the Fabry-Perot cavity 140, the imaging unit 142, and the detector 150. This integrated design can facilitate maintenance of the relative alignment of different components.

Although the present disclosure only includes one embodiment, it is understood that various modifications and enhancements may be made without departing from the following claims.

What is claimed is:

1. A device, comprising:
   a plurality of tunable lasers operable to produce laser beams at different wavelengths;
   a plurality of fibers having input terminals to respectively coupled to said tunable lasers to receive said laser beams and output terminals to output said laser beams, wherein said output terminals are coupled together to form a fiber bundle;
   a collimating lens positioned to receive said laser beams from said fiber bundle and to direct said laser beams to pass through or near a common location in different directions with respect to one another;
   a steering mirror having a front surface positioned in optical paths of said laser beams from said collimating lens and a back reflective surface;
   a mirror control module coupled to said steering mirror and operable to adjust said steering mirror at a plurality of selected steering angles to respectively direct said laser beams from said different directions to, one at a time, along a common direction;
   a laser control mechanism operable to detect a frequency error in a laser beam when selected to be directed along said common direction, said laser control mechanism operable to control a respective tunable laser that produces said laser beam to reduce said frequency error; and
   an active control mechanism having a laser operable to produce an optical monitor beam to said back reflective surface and an optical detector positioned to receive said optical monitor beam reflected from said back reflective surface and operable to determine said angular error according to a position of said optical monitor beam on said optical detector.

2. The device as in claim 1, wherein said mirror control module includes an actuator operable to adjust an orientation of said steering mirror, and wherein said active control mechanism monitors an angular error in said orientation from each of said selected steering angles and controls said actuator to correct said angular error.

3. The device as in claim 2, wherein said active control mechanism optically measures said error.

4. The device as in claim 3, wherein said active control mechanism includes a control unit operable to control said actuator to reduce said angular error.

5. The device as in claim 1, wherein said laser control mechanism includes:
- a Fabry-Perot cavity spaced away from said steering mirror along said common direction and oriented to have a cavity optical axis parallel to said common direction;
- a photodetector to receive an optical output from said Fabry-Perot cavity; and
- a control unit coupled to receive an output signal from said photodetector to detector said frequency error and to control said respective tunable laser.

6. The device as in claim 5, further comprising an imaging lens located between said photodetector and said Fabry-Perot cavity, and a spatial filter between said imaging lens and said photodetector operable in combination to direct only one beam onto said photodetector that enters said Fabry-Perot cavity along said common direction.

7. A method, comprising:
- coupling laser beams from a plurality of tunable lasers into receiving terminals of a plurality of fibers, respectively;
- combining output terminals of said fibers together to form a bundle;
- using a single lens to collect said laser beams from said output terminals and to direct said laser beams to a front surface of a steering mirror in different directions;
- controlling said steering mirror at a plurality of steering angles to direct said laser beams to a Fabry-Perot cavity, wherein at each steering angle, only one of said laser beams is along an optical axis of said Fabry-Perot cavity;
- detecting only one transmitted beam from said Fabry-Perot cavity from a laser beam that enters said Fabry-Perot cavity along said optical axis to determine a frequency deviation of a tunable laser that produces said laser beam;
- adjusting said tunable laser to reduce said frequency deviation;
- controlling said steering minor to direct a laser beam produced by another tunable laser along said optical axis to detector a respective frequency deviation of said another laser and to adjust said another tunable laser, and
- optically monitoring said steering mirror by directing a monitoring beam to a back reflective surface of said steering minor and measuring a reflective angle of the optical monitor beam to determine the orientation of said steering mirror with respect to a desired orientation.

8. The method as in claim 7, further comprising spatially filtering transmitted beams from said Fabry-Perot cavity to detect only said laser beam.

* * * * *